US012763431B2

(12) United States Patent
Oki

(10) Patent No.: US 12,763,431 B2
(45) Date of Patent: Oct. 13, 2026

(54) NON-AQUEOUS ELECTROLYTE SECONDARY BATTERY INCLUDING SEPARATOR WITH MASKING REGION INHIBITING PERMEATION OF LITHIUM IONS

(71) Applicant: Panasonic Intellectual Property Management Co., Ltd., Osaka (JP)

(72) Inventor: Yukihiro Oki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 754 days.

(21) Appl. No.: 17/794,852

(22) PCT Filed: Jan. 26, 2021

(86) PCT No.: PCT/JP2021/002535
§ 371 (c)(1),
(2) Date: Jul. 22, 2022

(87) PCT Pub. No.: WO2021/153528
PCT Pub. Date: Aug. 5, 2021

(65) Prior Publication Data

US 2023/0055724 A1 Feb. 23, 2023

(30) Foreign Application Priority Data

Jan. 31, 2020 (JP) ................................ 2020-014763

(51) Int. Cl.
*H01M 50/449* (2021.01)
*H01M 10/0525* (2010.01)
*H01M 50/414* (2021.01)

(52) U.S. Cl.
CPC ..... *H01M 50/449* (2021.01); *H01M 10/0525* (2013.01); *H01M 50/414* (2021.01)

(58) Field of Classification Search
CPC ............ H01M 50/449; H01M 50/414; H01M 10/0525
(Continued)

(56) References Cited

U.S. PATENT DOCUMENTS

2008/0032197 A1 2/2008 Horpel et al.
2013/0171484 A1 7/2013 Baginska et al.
(Continued)

FOREIGN PATENT DOCUMENTS

CN 101160677 A 4/2008
CN 109888150 A 6/2019
(Continued)

OTHER PUBLICATIONS

"End." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1244023. (Year: 2010).*
(Continued)

*Primary Examiner* — Sean P Cullen
(74) *Attorney, Agent, or Firm* — WHDA, LLP

(57) ABSTRACT

This non-electrolyte secondary battery comprises: a positive electrode which has a positive electrode mixture layer including a positive electrode active material; a negative electrode which has a negative electrode mixture layer including a negative electrode active material; and a separator which is disposed between facing surfaces of the positive electrode and the negative electrode, and through which lithium ions pass. The separator is provided with a masking region in which fine pores are sealed with paraffin to prevent the lithium ions from passing therethrough.

3 Claims, 9 Drawing Sheets

(58) Field of Classification Search
USPC .......................................... 429/247, 248, 255
See application file for complete search history.

(56) References Cited

U.S. PATENT DOCUMENTS

| | | | | | |
|---|---|---|---|---|---|
| 2013/0287937 | A1* | 10/2013 | Joo | ..................... | H01M 50/414<br>427/126.3 |
| 2014/0220402 | A1* | 8/2014 | Ueki | ................... | H01M 50/466<br>429/94 |
| 2014/0272489 | A1 | 9/2014 | Anandan et al. | | |

FOREIGN PATENT DOCUMENTS

| | | | | | |
|---|---|---|---|---|---|
| EP | 0536425 | A1 | | 4/1993 | |
| GB | 593643 | A | * | 10/1947 | ............ H01M 50/60 |
| JP | 11-86909 | A | | 3/1999 | |
| JP | 2005-190785 | A | | 7/2005 | |
| JP | 2012204335 | A | * | 10/2012 | |
| JP | 2013211193 | A | * | 10/2013 | |
| JP | 2014-26918 | A | | 2/2014 | |
| JP | 2016-110886 | A | | 6/2016 | |
| JP | 2018137079 | A | * | 8/2018 | |
| JP | 2019-21394 | A | | 2/2019 | |

OTHER PUBLICATIONS

“Inside.” In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1258320. (Year: 2010).*
Office Action dated Nov. 15, 2022, issued in counterpart IN Application No. 202247042011, with English Translation. (5 pages).
Extended (Supplementary) European Search Report dated Dec. 8, 2023, issued in counterpart EP Application No. 21747825.4. (8 pages).
International Search Report dated Apr. 13, 2021, issued in counterpart International Application No. PCT/JP2021/002535 (2 pages).
Office Action dated Jan. 12, 2024, issued in counterpart CN Application No. 202180010554.8, with partial English translation. (14 pages).
Office Action dated May 20, 2025, issued in counterpart JP Application No. 2021-574041. (3 pages).

* cited by examiner

| | Masking Area (%) | Capacity (%) | Capacity Maintenance Rate 100 cyc (%) | Masking Pattern |
|---|---|---|---|---|
| Comparative Example | 0 | 100 | 85 |  |
| Example 1 | 13 | 100 | 89 |  |
| Example 2 | 16 | 97 | 90 |  |
| Example 3 | 17 | 93 | 89 |  |
| Example 4 | 21 | 90 | 89 |  |
| Example 5 | 22 | 84 | 91 |  |
| Example 6 | 27 | 86 | 92 |  |
| Example 7 | 12 | 92 | 90 |  |

NON-AQUEOUS ELECTROLYTE SECONDARY BATTERY INCLUDING SEPARATOR WITH MASKING REGION INHIBITING PERMEATION OF LITHIUM IONS

CROSS-REFERENCE TO RELATED APPLICATION

This application is a National Phase Application filed under 35 U.S.C. § 371 of International Application No. PCT/JP2021/002535 filed on Jan. 26, 2021 which claims the benefit of priority under 35 U.S.C. § 119(a) of Japanese Patent Application No. 2020-014763 filed in Japan on Jan. 31. 2020, the contents of which are incorporated herein by reference.

TECHNICAL FIELD

The present disclosure relates to a non-aqueous electrolyte secondary battery, including: a positive electrode having a positive electrode mixture layer including a positive electrode active material; a negative electrode having a negative electrode mixture layer including a negative electrode active material; and a separator interposed between opposite surfaces of the positive electrode and the negative electrode, and being permeable to lithium ions.

BACKGROUND ART

Secondary batteries include lithium-ion batteries, which are non-aqueous electrolyte secondary batteries, and widespread is a wound battery in which electrodes are wound to increase a capacity. In such a wound battery, a negative electrode is absent at a position corresponding to a positive electrode in some cases due to winding deviation and the like. In this case, since lithium ions move also from the positive electrode not having the corresponding negative electrode at an end part of the negative electrode opposite to the positive electrode, lithium metal is likely to precipitate. Thus, Patent Literature 1 discloses that a region impermeable to lithium ions is provided at an end part of a separator for decreasing lithium ions reaching the end part of the negative electrode to prevent the lithium precipitation.

CITATION LIST

Patent Literature

PATENT LITERATURE 1: Japanese Unexamined Patent Application Publication No. 2005-190785

SUMMARY

A challenge of the non-aqueous electrolyte secondary battery is to inhibit battery deterioration, and various proposals have been made. Although the capacity of the battery decreases with repeated charges and discharges, this decrease in the capacity is not linear but (i) decreases relatively largely in the beginning, then (ii) enters a stable period with little change in the capacity for a while, and thereafter (iii) decreases largely again.

Thus, it has been considered that intentionally setting a state of the stable period (ii) may inhibit the decrease in the capacity.

A non-aqueous electrolyte secondary battery according to the present disclosure is a non-aqueous electrolyte secondary battery including: a positive electrode having a positive electrode mixture layer including a positive electrode active material; a negative electrode having a negative electrode mixture layer including a negative electrode active material; and a separator interposed between opposite surfaces of the positive electrode and the negative electrode and being permeable to lithium ions, wherein a masking region inhibiting permeation of lithium ions is provided on the separator to restrict release of lithium ions from the negative electrode mixture layer during discharge, and the discharge can be terminated before a negative electrode voltage begins to rapidly rise just before a complete discharge.

According to the present disclosure, the masking region is provided to unevenly distribute Li in the electrodes, and the decrease in the capacity can be inhibited by inhibiting a side reaction in a region near the complete discharge.

In addition, the masking region is formed using paraffin, which enables to form an appropriate masking region easily.

BRIEF DESCRIPTION OF DRAWINGS

FIG. 3(*a*) is a view illustrating a conventional battery, and FIG. 3(*b*) is a view illustrating a battery of the present disclosure.

DESCRIPTION OF EMBODIMENTS

Hereinafter, embodiments of the present disclosure will be described with reference to the drawings. The present disclosure is not limited to the embodiments described herein.

"Description of Summary of the Present Disclosure"

As described above, the non-aqueous electrolyte secondary battery according to the present disclosure achieves the stable period with little fluctuation in the charged state with respect to the number of cycles of charge and discharge.

Figure 1:
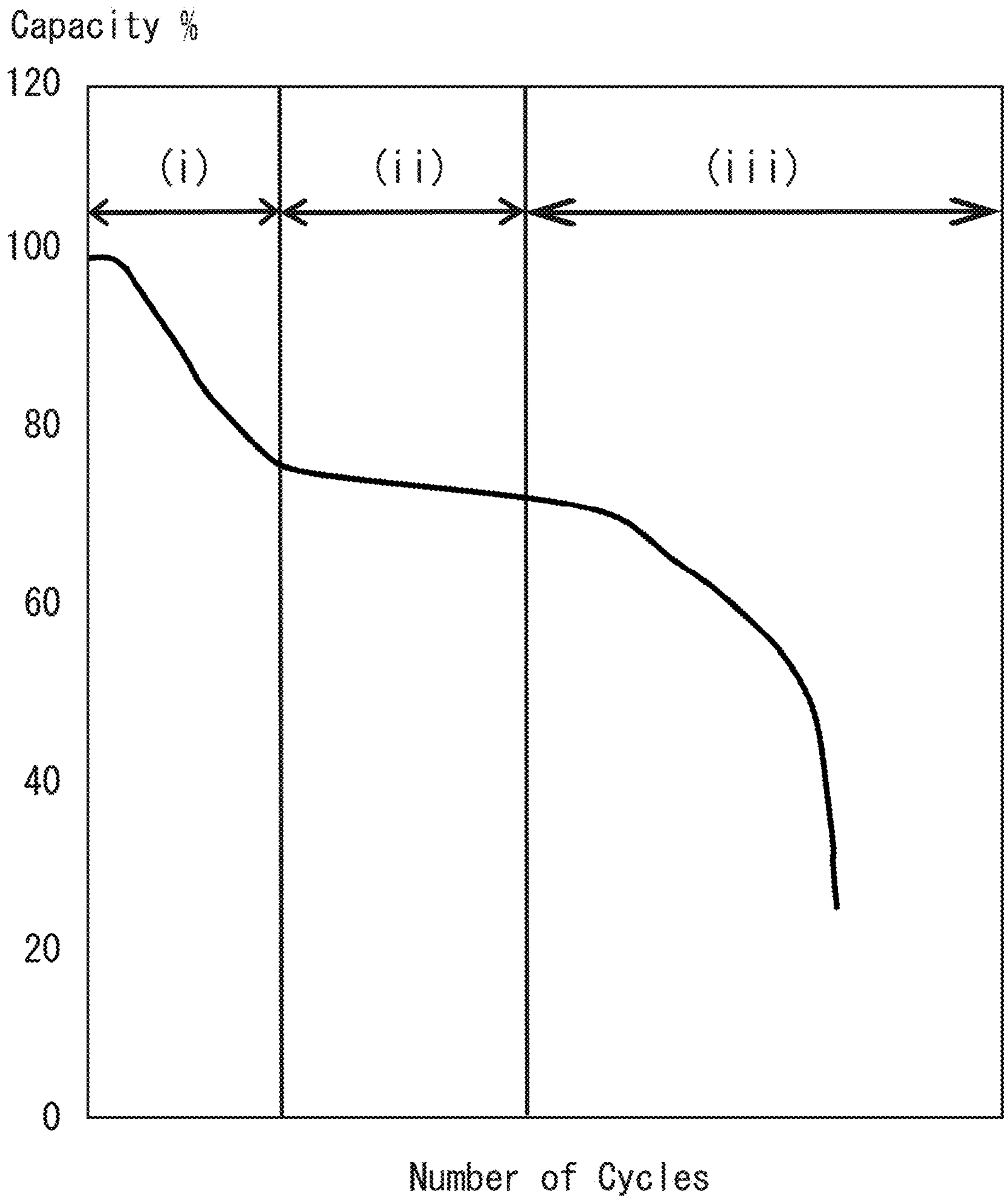
FIG. 1 is a graph indicating a change in a capacity with respect to the number of cycles of charge and discharge.

FIG. 1 is a graph indicating a change in a capacity with respect to the number of cycles of charge and discharge when a cylindrical 18650-size (ternary system of Ni—Co—Mn (NCM)/graphite) graphite-type battery cell is repeatedly charged and discharged at 25° C. with 0.5-C cycle. As indicated, the decrease in the capacity is large in the initial period of the cycle (i), and the decrease in the capacity is small and stable in the middle period of the cycle (ii). Then, the decrease becomes large in the end period of the cycle (iii) to end the lifetime.

A battery in a discharged state at the end of the initial period of the cycle (i) is disassembled. According to observation result of the negative electrode, portions near both the upper and lower ends become blue. Since the negative electrode changes its color with absorbing Li ions, both ends and the center have different colors as above. Thus, the battery at the end of the initial period of the cycle (i) is found to have unevenly distributed Li in the negative electrode. Therefore, it is possible that the initial decrease in the capacity may be inhibited by actively generating the uneven distribution of Li in the electrode.

Figure 2:
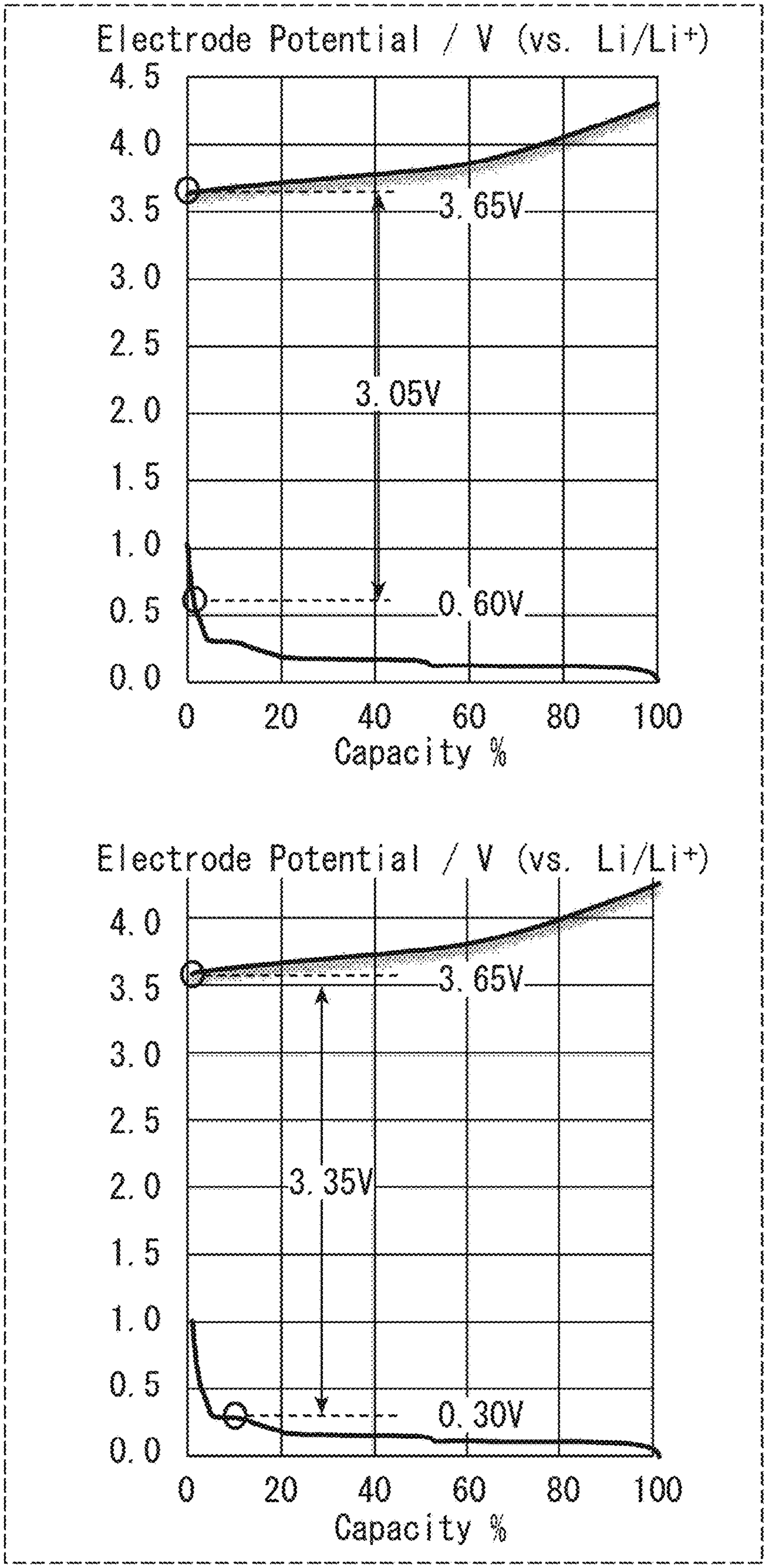
FIG. 2 are graphs indicating an electrode potential (V (vs. Li/Li*)) in charge and discharge.

FIG. 2 are graphs indicating an electrode potential (V (vs. $Li/Li^+$)) in charge and discharge. The positive electrode potential changes in a relatively smooth curve near a straight line depending on a state of charge (SOC). In this example, the positive electrode potential is 3.65 V in the discharged state, and approximately 4.4 V with fully charged. Meanwhile, the negative electrode potential rapidly rises from approximately several percent of the capacity near fully discharged (SOC). Since the discharge ends at an interelectrode potential of approximately 3.0 V, the negative electrode potential in this time is approximately 0.6 V, which is after the rapid rise in the negative electrode potential from approximately 0.3 V. Such a rapid rise in the negative electrode potential suggests a possibility of occurrence of a side reaction other than charge and discharge reactions in a normal battery. Thus, it is considered that the deterioration may be inhibited by inhibiting this side reaction, and therefore it is considered that the discharge of the negative electrode can be terminated by the plain part.

In the present disclosure, a masking region impermeable to Li ions is formed on a separator. This constitution unevenly distributes Li on the electrode, and may terminate the discharge before the negative electrode potential rapidly rises.

Figure 3:
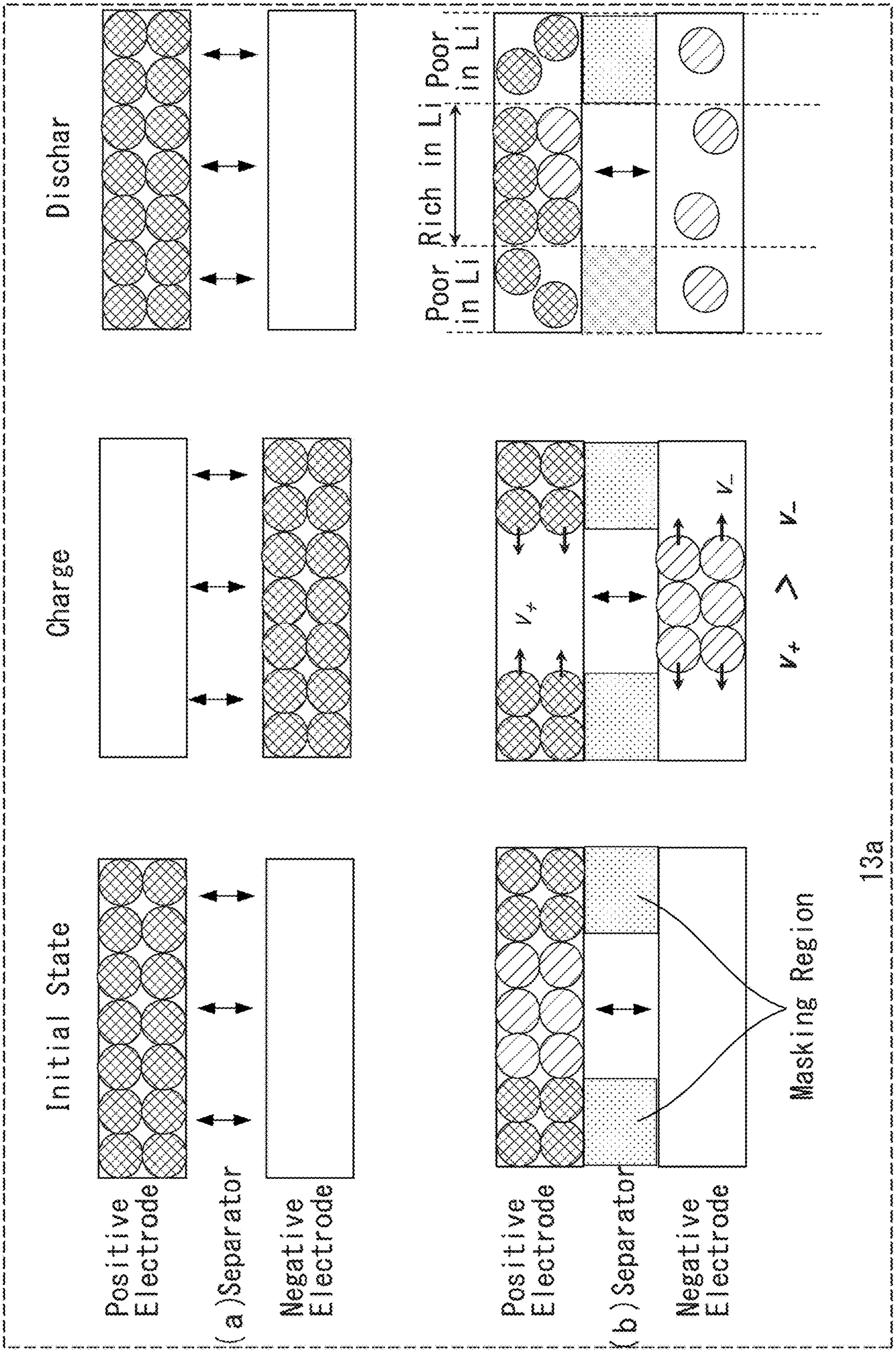
FIG. 3(*a*) and FIG. 3(*b*) are views illustrating a state of Li in positive and negative electrodes during charge and discharge.

FIG. 3(*a*) and FIG. 3(*b*) are views illustrating a state of Li in the positive and negative electrodes during charge and discharge. FIG. 3(*a*) is a view illustrating a conventional battery, and FIG. 3(*b*) is a view illustrating the battery of the present disclosure.

As shown, in the conventional battery, Li is present in the positive electrode in the initial state (discharged state), moves to the negative electrode with charging, and moves to the positive electrode with discharging. These steps are repeated with charge and discharge. Meanwhile, in the battery of the present disclosure, the masking region is formed on the separator. Thus, Li is present in the positive electrode in the initial state (discharged state) same as in the conventional battery, but the masking region inhibits the move of Li to the negative electrode with charging, and Li in an area corresponding to the masking region on the positive electrode does not move to remain in the negative electrode. Although, Li spreads in the positive electrode and negative electrode, the charge ends in a state where Li is unevenly distributed. It is to be noted that a voltage v+ for the Li move in the positive electrode is higher than a voltage v. for the Li move in the negative electrode because the positive electrode has a larger voltage gradient in the electrode. Then, when the battery is discharged, the discharge ends in a state where Li in the electrodes is unevenly distributed, and a small amount of Li remains in the negative electrode since the masking region is present.

As above, Li can be unevenly distributed in the electrodes, and the discharge can be terminated in a state of incomplete release of Li from the negative electrode (before the rise in the negative electrode potential).

"Description of Embodiments"

Hereinafter, an example of an embodiment of the non-aqueous electrolyte secondary battery according to the present disclosure will be described. Hereinafter, a cylindrical battery in which a wound electrode assembly is housed in a bottomed cylindrical exterior housing can will be exemplified, but the exterior housing body is not limited to the cylindrical exterior housing can, and may be, for example, a rectangular exterior housing can and an exterior housing body constituted with a laminated sheet including a metal layer and a resin layer. The electrode assembly may be a stacked electrode assembly in which a plurality of positive electrodes and a plurality of negative electrodes are alternately stacked with a separator interposed therebetween.

<Entire Constitution of Wound Battery>

Figure 4:
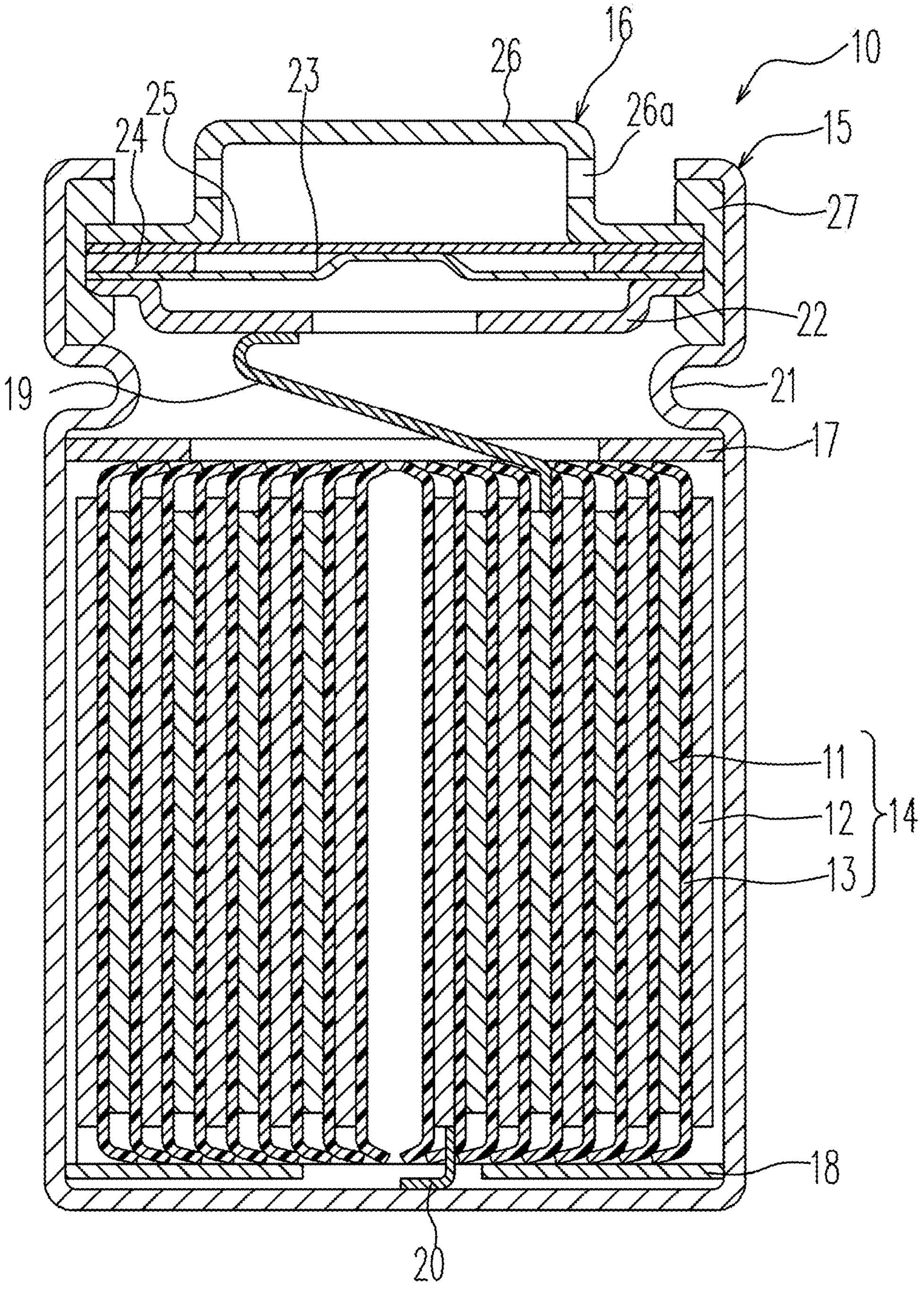
FIG. 4 is a lengthwise sectional view of a cylindrical secondary battery 10 of an example of an embodiment.

FIG. 4 is a lengthwise sectional view of a cylindrical secondary battery 10 of an example of an embodiment. In the secondary battery 10 illustrated in FIG. 4, an electrode assembly 14 and a non-aqueous electrolyte are housed in an exterior housing body 15. The electrode assembly 14 has a wound structure in which a positive electrode 11 and a negative electrode 12 are wound with a separator 1 interposed therebetween. For a non-aqueous solvent of the non-aqueous electrolyte (organic solvent), carbonates, lactones, ethers, ketones, esters, and the like may be used, and two or more of these solvents may be mixed to be used. When two or more of the solvent are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. For an electrolyte salt in the non-aqueous electrolyte, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L. Hereinafter, for convenience of description, the sealing assembly 16 side will be described as "the upper side", and the bottom side of the exterior housing body 15 will be described as "the lower side".

An opening end of the exterior housing body 15 is capped with the sealing assembly 16 to seal inside the secondary battery 10. Insulating plates 17 and 18 are provided on the upper and lower sides of the electrode assembly 14, respectively. A positive electrode lead 19 extends upward through a through hole of the insulating plate 17, and welded with the lower face of a filter 22, which is a bottom plate of the sealing assembly 16. In the secondary battery 10, a cap 26, which is a top plate of the sealing assembly 16 electrically connected to the filter 22, becomes a positive electrode terminal. Meanwhile, a negative electrode lead 20 extends through a through hole of the insulating plate 18 toward the bottom side of the exterior housing body 15, and welded with a bottom inner face of the exterior housing body 15. In the secondary battery 10, the exterior housing body 15 becomes a negative electrode terminal. When the negative electrode lead 20 is provided on a terminal end part, the negative electrode lead 20 extends through the outside of the insulating plate 18 toward the bottom side of the exterior housing body 15, and welded with a bottom inner face of the exterior housing body 15.

The exterior housing body 15 is, for example, a bottomed cylindrical metallic exterior housing can. A gasket 27 is provided between the exterior housing body 15 and the sealing assembly 16 to achieve sealability inside the secondary battery 10. The exterior housing body 15 has a grooved part 21 formed by, for example, pressing the side part thereof from the outside to support the sealing assembly 16. The grooved part 21 is preferably formed circularly along the circumferential direction of the exterior housing body 15, and supports the sealing assembly 16 with the gasket 27 interposed therebetween and with the upper face of the grooved part 21.

The sealing assembly 16 has a stacked structure of a filter 22, a lower vent member 23, an insulating member 24, an upper vent member 25, and a cap 26 in this order from the electrode assembly 14 side. Each member constituting the sealing assembly 16 has, for example, a disk shape or a ring shape, and each member except for the insulating member 24 is electrically connected each other. The lower vent member 23 and the upper vent member 25 are connected each other at each of central parts thereof, and the insulating member 24 is interposed between each of the circumferential parts of the vent members 23 and 25. If the internal pressure of the battery increases with abnormal heat generation, for example, the lower vent member 23 breaks and the upper vent member 25 expands toward the cap 26 side to be separated from the lower vent member 23, resulting in cutting off of an electrical connection between both members. If the internal pressure further increases, the upper vent member 25 breaks, and gas is discharged through an opening 26*a* of the cap 26.

<Constitution of Electrode Assembly>

Figure 5:
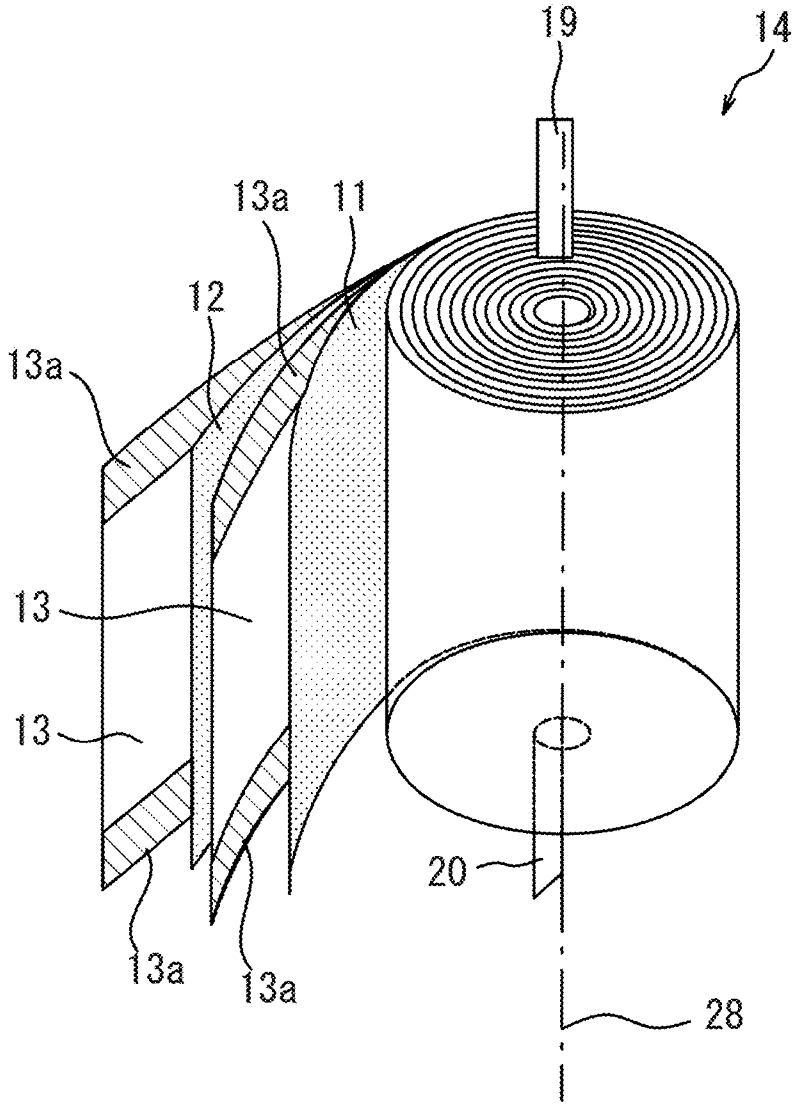
FIG. 5 is a perspective view illustrating a constitution of an electrode assembly.

Next, the electrode assembly 14 will be described with reference to FIG. 5. FIG. 5 is a perspective view of the electrode assembly 14. As described above, the electrode assembly 14 has a wound structure which the positive electrode 11 and the negative electrode 12 are spirally wound with the separator 13 interposed therebetween. Any of the positive electrode 11, the negative electrode 12, and the separator 13 is formed in a band shaped, and spirally wound around a winding core disposed along a winding axis 28 to be alternately stacked in the radial direction of the electrode assembly 14. In the radial direction, the side of winding axis 28 is referred to as the inner peripheral side, and the opposite side is referred to as the outer peripheral side. In the electrode assembly 14, the longitudinal direction of the positive electrode 11 and negative electrode 12 corresponds to a winding direction, and the width direction of the positive electrode 11 and negative electrode 12 corresponds to an axial direction. The positive electrode lead 19 extends, on the upper end of the electrode assembly 14 toward the axial direction, from a substantial center between the center and the outermost circumference in the radial direction. The negative electrode lead 20 extends, on the lower end of the electrode assembly 14, toward the axial direction from near the winding axis 28.

<Constitution of Separator>

For the separator 13, a porous sheet having an ion permeation property and an insulation property is used. Specific examples of the porous sheet include a fine porous thin film, a woven fabric, and a nonwoven fabric. As a material of the separator 13, an olefin resin such as polyethylene and polypropylene is preferable. A thickness of the separator 13 is, for example, 10 μm to 50 μm. The separator 13 has tended to be thinned as higher capacity and higher output of the battery. The separator 13 has a melting point of, for example, approximately 130° C. to 180° C.

<Masking Region>

In the present embodiment, band-shaped masking regions 13*a* are provided on the upper end part and lower end part of the separator 13. This masking region 13*a* is a region where pores are sealed with, for example, paraffin, so as to prevent the permeation of Li ions.

The paraffin is solid at a normal temperature and melts at, for example, 80° C. or higher. Thus, the masking region 13*a* may be formed by immersing the separator 13 in a liquid paraffin. A temperature of the liquid paraffin is set to be a temperature lower than a melting point of the separator. Various paraffins having different properties are commercially available. When a drying temperature of the battery cell is 105° C. and the melting point of the separator is approximately 135° C., for example, paraffin having a meting point of approximately 100 to 120° C. is considered to be appropriate.

Since the liquid paraffin quickly permeates into the resin separator 13, processing is extremely easy. Thus, masking regions having various patterns may be formed by printing. The paraffin, which is a chain saturated hydrocarbon represented by, for example, ($C_nH_{2n+2}$) and has a main skeleton same as polyethylene, has resistance to oxidation and reduction, and is inexpensive. Furthermore, since not being non-polar, the paraffin does not mix with the electrolyte liquid to be eluted. In addition, the masking region is just become clear, changes no thickness and the like, and hardly causes level difference or creases. In particular, the separator 13 being polyethylene facilitates sealing the pores with the paraffin.

Although the masking region may be formed by attaching a tape impermeable to Li ions or by heat melting, it should be noted that a case of the tape is likely to cause level difference, and a case of the heat melting is likely to cause creases.

<Masking Pattern>

In the present embodiment, the masking region is provided to unevenly distribute Li in the electrodes. Thus, the masking region may be provided inside the battery with partially restricting the move of Li ions. In particular, since enlarging a portion having no masking region increases a region having no effect of move restriction of Li ions, the masking region is preferably provided on the inside part at a certain interval.

An area of the masking region is, for example 0.1% or more, preferably 0.5% or more, more preferably 1% or more, and particularly preferably 5% or more, based on an area of the separator 13. For example, the masking region having an area of 5% or more has more remarkable effect of improving the capacity maintenance rate. On the other hand, an upper limit of the area of the masking region is preferably 50% or less, and more preferably 30% or less from the viewpoints of maintaining the battery capacity and the like.

Figure 6:
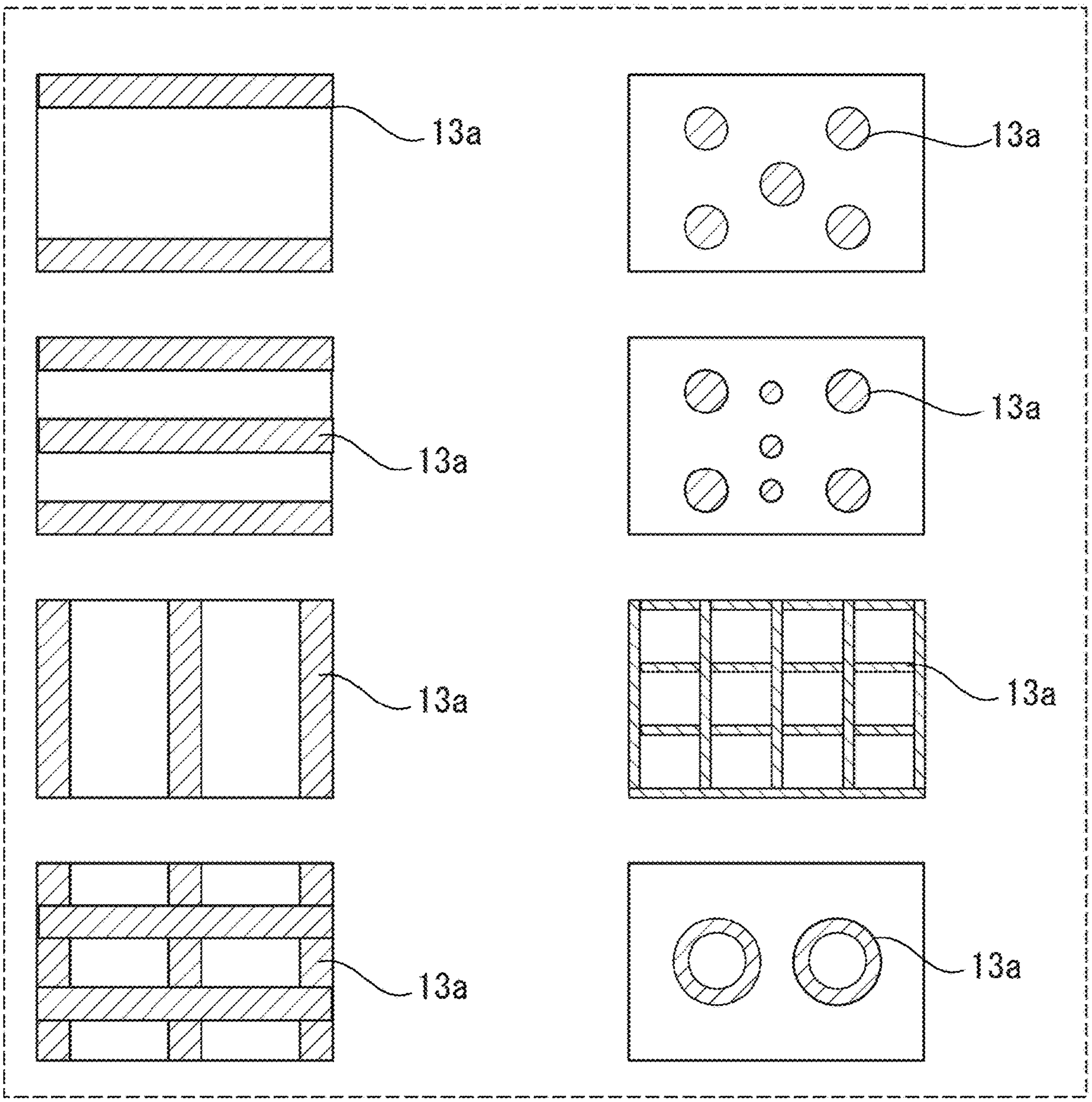
FIG. 6 is a view illustrating each masking pattern.

FIG. 6 is a view illustrating each masking pattern. As shown, the position of the masking region is not limited to the end part of the battery, and the masking region may be discretely provided on the inside part to form a discrete masking region, and may have a grid shape. The masking region provided on the inside part of the separator should be modified such as even distribution, a larger amount near the center, and a larger amount near the end part, for improving characteristics to form a continuous masking region. One or more continuous masking regions may each extend from one longitudinal end to an other longitudinal end of the separator. Thus, in a case of the grid shape, a region where is not the masking region is surrounded by the masking region. When a short circuit occurs in this region, the masking region may function as a partition for terminating the thermal runaway to improve safety.

<Constitutions of Positive Electrode and Negative Electrode>

Figure 7:
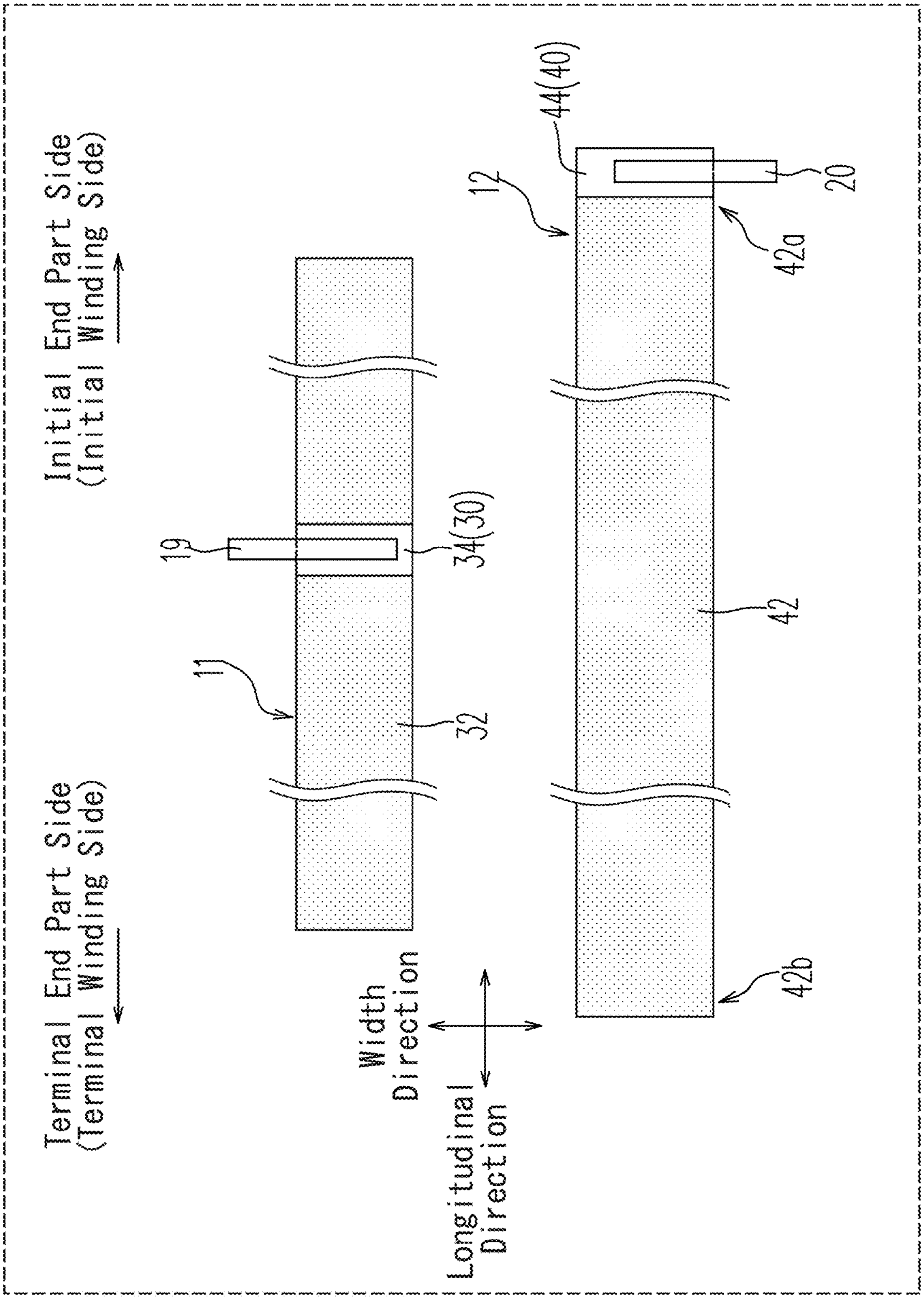
FIG. 7 are front views of a positive electrode and negative electrode constituting an electrode assembly.

FIG. 7 are front views of the positive electrode 11 and negative electrode 12 constituting the electrode assembly 14. In FIG. 7, the positive electrode 11 and the negative electrode 12 are illustrated with an unwound state. The negative electrode 12 is formed to be larger than the positive electrode 11 to prevent precipitation of lithium on the negative electrode 12 in this electrode assembly 14. Specifically, a length in the width direction (axial direction) of the negative electrode 12 is larger than a length in the width direction of the positive electrode 11. In addition, a length in the longitudinal direction of the negative electrode 12 is larger than a length in the longitudinal direction of the positive electrode 11. As a result, at least a portion on which the positive electrode mixture layer 32 of the positive electrode 11 is formed is disposed opposite to a portion on which negative electrode mixture layer 42 of the negative electrode 12 is formed with the separator 13 interposed therebetween when wound as the electrode assembly 14.

<Positive Electrode>

The positive electrode 11 has a band-shaped positive electrode current collector 30 and a positive electrode mixture layer 32 formed on the positive electrode current collector 30. The positive electrode mixture layer 32 is formed on at least one of the inner peripheral side and outer peripheral side of the positive electrode current collector 30. For the positive electrode current collector 30, a foil of a metal, such as aluminum, a film in which such a metal is disposed on a surface layer thereof, and the like are used, for example. A preferable positive electrode current collector 30 is a foil of aluminum or of a metal mainly composed of an aluminum alloy. A thickness of the positive electrode current collector 30 is, for example, 10 μm to 30 μm.

The positive electrode mixture layer 32 is preferably formed on an entire region of both surfaces of the positive electrode current collector 30 except for a positive electrode exposed part 34, described later. The positive electrode mixture layer 32 preferably includes a positive electrode active material, a conductive agent, and a binder. The positive electrode mixture layer 32 is formed by applying a positive electrode mixture slurry including the positive electrode active material, the conductive agent, the binder, and a solvent such as N-methyl-2-pyrrolidone (NMP) on both surfaces of the positive electrode current collector 30; and drying. The positive electrode mixture layer 32 is then compressed.

Examples of the positive electrode active material may include a lithium-containing transition metal oxide containing a transition metal element such as Co, Mn, and Ni. The lithium-containing transition metal oxide is not particularly limited, and preferably a composite oxide represented by the general formula $Li_{1+x}MO_2$ (in the formula, $-0.2<x\leq 0.2$ and M includes at least one of the group consisting of Ni, Co, Mn, and Al). For example, used is NCA in which a part of nickel is substituted with cobalt and aluminum is added.

As the conductive agent included in the positive electrode mixture layer 32, carbon materials such as carbon black (CB), acetylene black (AB), Ketjenblack, and graphite may be exemplified.

Examples of the binder included in the positive electrode mixture layer 32 include fluororesins such as polytetrafluoroethylene (PTFE) and polyvinylidene fluoride (PVDF), polyacrylonitrile (PAN), polyimide (PI), an acrylic resin, and a polyolefin resin. When the positive electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. As the binder, a rubber resin having a molecular structure repeating double bonds and single bonds, such as SBR and NBR, is preferable from the viewpoint of flexibility of the positive electrode 11. These materials may be used singly, and may be used in combination of two or more thereof. A content rate of the binder in the positive electrode mixture layer 32 is 0.5 mass % to 10 mass %, and preferably 1 mass % to 5 mass %.

A positive electrode exposed part 34 where a surface of the positive electrode current collector 30 is exposed is provided on the positive electrode 11. The positive electrode exposed part 34 is a portion where the positive electrode lead 19 is to be connected and a portion where the surface of the positive electrode current collector 30 is uncovered with the positive electrode mixture layer 32. The positive electrode exposed part 34 is formed to be larger than the positive electrode lead 19 in the longitudinal direction. The positive electrode exposed part 34 is preferably provided on both the surfaces of the positive electrode 11 so as to be stacked in the thickness direction of the positive electrode 11. The positive electrode lead 19 is bonded to the positive electrode exposed part 34 with, for example, ultrasonic welding.

<Negative Electrode>

The negative electrode 12 has the band-shaped negative electrode current collector 40 and the negative electrode mixture layer 42 formed on both surfaces of the negative electrode current collector 40. For the negative electrode current collector 40, a foil of a metal such as copper, a film in which such a metal is disposed on a surface layer thereof, or the like is used, for example. A thickness of the negative electrode current collector 40 is, for example, 5 μm to 30 μm.

The negative electrode mixture layer 42 is preferably formed on an entire region of both surfaces of the negative electrode current collector 40 except for a negative electrode exposed part 44, described later. The negative electrode mixture layer 42 preferably includes a negative electrode active material and a binder. The negative electrode mixture layer 42 is formed by: applying a negative electrode mixture slurry including the negative electrode active material, the binder, and a solvent such as water on both surfaces of the negative electrode current collector 40; and drying. The negative electrode mixture layer 42 is then compressed.

The negative electrode active material is not particularly limited as long as it may reversibly occlude and release lithium (Li) ions, and for example, carbon materials such as natural graphite and artificial graphite, metals that form an alloy with lithium such as Si and Sn, or an alloy or oxide including them may be used. For example, used is a combination of: graphite; and a first silicon material containing a silicon oxide phase and a dispersed silicon in the silicon oxide phase (hereinafter, referred to as "SiO") and a second silicon material containing a lithium silicate phase and a dispersed silicon in the lithium silicate phase (hereinafter, referred to as "LSX"), as silicon-based active materials.

The binder included in the negative electrode mixture layer 42 is typically made of a resin (resin binder), and examples thereof include fluororesins such as polytetrafluoroethylene (PTFE) and polyvinylidene fluoride (PVDF), polyacrylonitrile (PAN), a polyimide (PI), an acrylic resin, and a polyolefin resin. When the negative electrode mixture slurry is prepared in an aqueous solvent, styrene-butadiene rubber (SBR), nitrile rubber (NBR), CMC or a salt thereof, polyacrylic acid or a salt thereof, polyvinyl alcohol, and the like may be used. As the binder, a rubber resin having a molecular structure repeating double bonds and single bonds, such as SBR and NBR, is preferable from the viewpoint of flexibility of the negative electrode 12. These materials may be used singly, and may be used in combination of two or more thereof. A content rate of the binder in the negative electrode mixture layer 42 is 0.5 mass % to 10 mass %, and preferably 1 mass % to 5 mass %.

In FIG. 7, a initial end part **42*a* of the negative electrode mixture layer 42 is a portion adjacent to the negative electrode exposed part 44. Meanwhile, a terminal end part 42***b* of the negative electrode mixture layer 42 is identical with the terminal end part of the negative electrode 12. The negative electrode mixture layer 42 is continuously present from the initial end part 42*a* to the terminal end part 42*b*.

EXAMPLES

The present disclosure will be further described below with Examples, but the present disclosure is not limited to these Examples.

Figure 8:
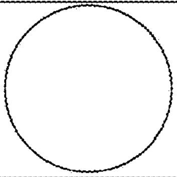
FIG. 8 is a table showing a capacity maintenance rate when each masking region is formed with using a coin cell.
Figure 8:
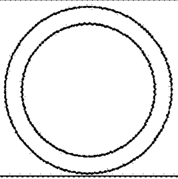
Figure 8:
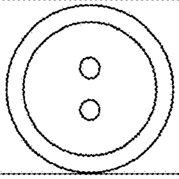
Figure 8:
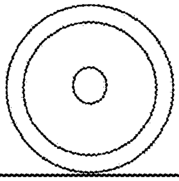
Figure 8:
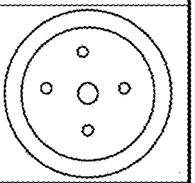
Figure 8:
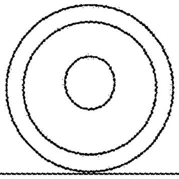
Figure 8:
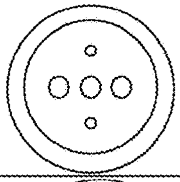
Figure 8:
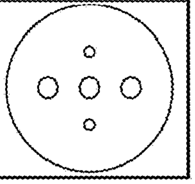

FIG. 8 is a table showing a capacity maintenance rate with using a coin cell when each masking region is formed. Used for the positive electrode active material was a lithium-containing transition metal oxide represented by $LiNi_{0.91}Co.Al.O_2$, and used for the negative electrode active material was a mixture of graphite:(SiO+LSX) at a mass ratio of 94:6.

In the cycle test, each battery of Examples and Comparative Example was charged under a temperature environment at 25° C. at a constant current of 0.3 C until a battery voltage reached 4.0 V, and charged at a constant voltage of 4.0 V until a current value reached 1/50 C. Then, the battery was discharged at a constant current of 0.5 C until a battery voltage reached 2.5 V. This charge-discharge cycle was repeated 100 cycles.

A masking area (%) is a rate of the masking region to an area opposite to the positive electrode and negative electrode functioning as the electrodes. A capacity (%) is a rate when a case of no masking is 100. A 100-cycle capacity maintenance rate is a rate of a battery capacity after 100 times of charges and discharges to an initial battery capacity. A masking pattern is a schematically illustrated masking region.

Comparative Example has no masking region, Example 1 is an example having a masking region provided only on the outer peripheral part, Examples 2 to 6 are examples having masking regions provided on the outer peripheral part and on the inside part, and Example 7 is an example having a masking region provided only on the inside part.

From the above, it is found that providing the masking region on any position rises the capacity maintenance rate. The masking area may be 0.1% because even a small area has the effect. Meanwhile, the upper limit thereof should be approximately 30% because a masking area of more than 30% much decreases the capacity.

Figure 9:
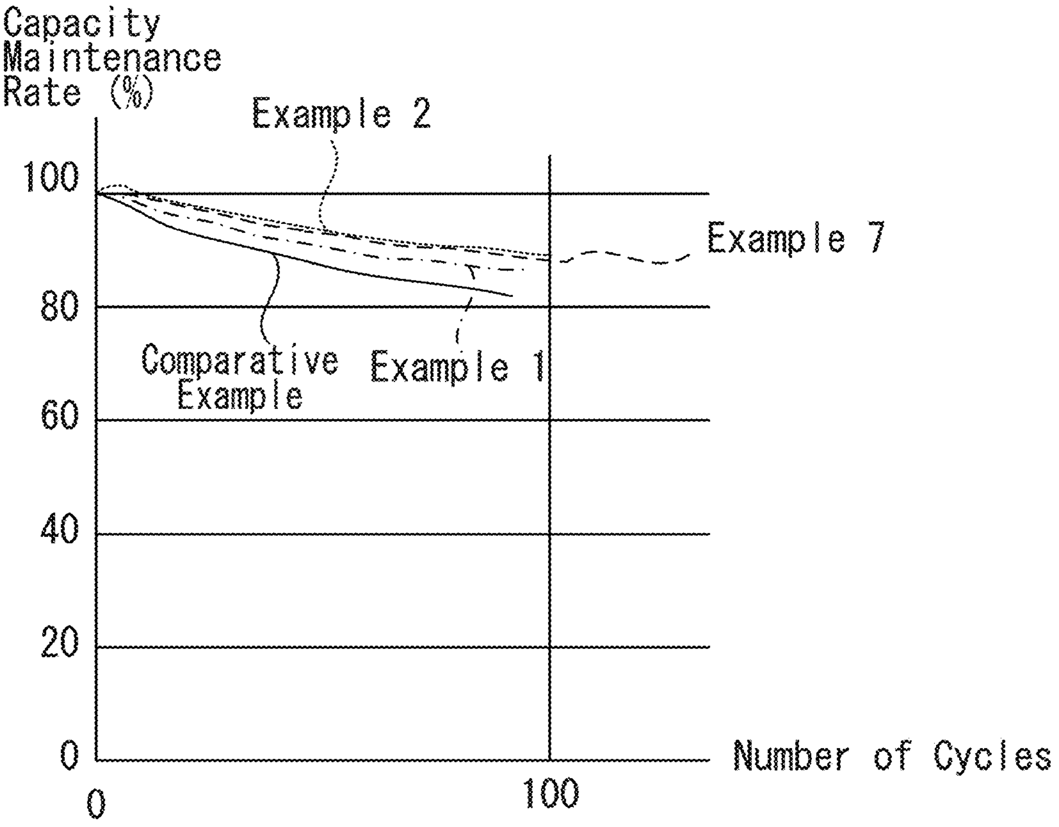
FIG. 9 is a graph indicating a change in a capacity with the number of cycles in Examples 1, 2, and 7, and Comparative Example.

FIG. 9 is a graph indicating a change in the capacity with the number of cycles in Examples 1, 2, and 7, and Comparative Example. As shown, Examples have lower decrease in the capacity than Comparative Example. In addition, the case where the masking region is also provided on the inside part has lower decrease in the capacity.

REFERENCE SIGNS LIST

10 Secondary battery
11 Positive electrode
12 Negative electrode
13 Separator
14 Electrode assembly
15 Exterior housing body
16 Sealing assembly
17, 18 Insulating plate
19 Positive electrode lead
20 Negative electrode lead
21 Grooved part
22 Filter
23 Lower vent member
24 Insulating member
25 Upper vent member
26 Cap
26*a* Opening
27 Gasket
28 Winding axis
30 Positive electrode current collector
32 Positive electrode mixture layer
34 Positive electrode exposed part
40 Negative electrode current collector
42 Negative electrode mixture layer
44 Negative electrode exposed part

The invention claimed is:

1. A non-aqueous electrolyte secondary battery, including:

a positive electrode having a positive electrode mixture layer including a positive electrode active material;

a negative electrode having a negative electrode mixture layer including a negative electrode active material; and a separator formed in a band shape and interposed between opposite surfaces of the positive electrode and the negative electrode and being permeable to lithium ions, wherein a masking region inhibiting permeation of lithium ions is provided on the separator to restrict release of lithium ions from the negative electrode mixture layer during discharge, the masking region is formed by sealing pores of the separator with paraffin permeated into the pores, and the masking region comprises one or both of:

(i) one or more continuous masking regions each extending from one longitudinal end to an other longitudinal end of the separator, at least one of the one or more continuous masking regions passing through a center part distanced in a width direction of the separator from an end part in the width direction of the separator; and (ii) a plurality of discrete masking regions disposed between the one and the other longitudinal ends of the separator, wherein at least one of the discrete masking regions is spaced away from each of the one and the other longitudinal ends of the separator.

2. The non-aqueous electrolyte secondary battery according to claim 1, wherein the masking region has a grid shape formed by the masking regions intersecting one another.

3. The non-aqueous electrolyte secondary battery according to claim 1, wherein a masking area of the separator is greater than or equal to 12% and less than or equal to 21% of the separator.

* * * * *